Figure 1:
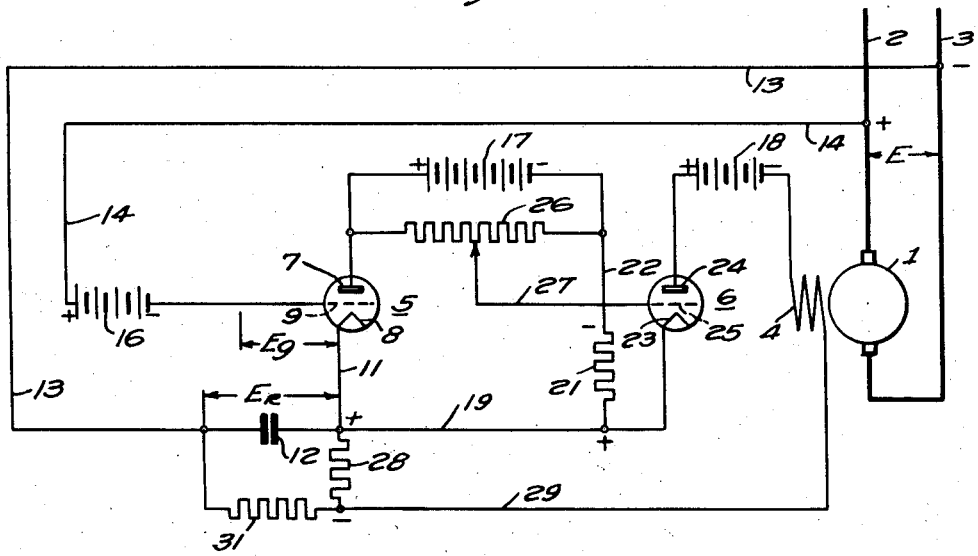

Nov. 3, 1942.　　　　E. LUDWIG　　　　2,300,515

ELECTRON TUBE REGULATOR

Filed May 1, 1941

WITNESSES:
E. A. McCloskey.
Wm. C. Groome

INVENTOR
Ernst Ludwig.
BY
Franklin E. Hardy
ATTORNEY

Patented Nov. 3, 1942

2,300,515

UNITED STATES PATENT OFFICE 2,300,515

ELECTRON TUBE REGULATOR

Ernst Ludwig, Berlin-Spandau, Germany, assignor to Westinghouse Electric & Manufacturing Company, East Pittsburgh, Pa., a corporation of Pennsylvania Application May 1, 1941, Serial No. 391,254
In Germany June 29, 1939

4 Claims. (Cl. 171—312)

This invention relates to electronic tube regulators and has application to regulators for controlling the field current of dynamo-electric machines.

The operation of the usual type of electronic tube regulator, such as is used for controlling the field current of electric machines, is similar in operating characteristic to a continuously adjustable ohmic resistor in the control circuit. At any instant the magnitude of the resistance which the electron tube regulator develops depends on the voltage impressed on the grid of the detector or control tube with respect to the cathode of the tube. Consequently, the regulator cannot develop a controlling impulse unless the grid potential varies from its normal value. The nature of the characteristic which represents the current in the control circuit for effecting a correction of the regulated quantity is a function of the grid voltage and is determined by the sensitiveness of the regulator. This variation in the grid potential of the primary control tube with variation in the regulated quantity introduces an error in to the operation of the regulator that cannot be corrected in the course of the normal functioning of the regulator since this variation in grid control voltage is necessary in order to effect the necessary variation in the current in the controlled circuit.

The present invention provides an electronic regulator in which the above static error of the regulator is eliminated or at least reduced in magnitude. It has been proposed to introduce a so-called restoring or compensating effect with the aid of a quantity which is derived from the output circuit of the regulator and which, when the equilibrium of the latter is disturbed on account of a change in the regulated quantity, creates an influence on the regulator that is added to the influence exerted thereon by the change in the value of the regulated quantity from its desired value which has initiated the change in the output circuit of the regulator. Such arrangements in the past have, however, tended to produce a condition leading to the hunting of the regulator by rapidly changing the regulator output current ultimately to a too high or a too low value.

In the arrangement disclosed in the present application, it is proposed to superimpose upon the detector circuit of the primary tube of the regulator a control impulse that is a measure of the output current from the regulator effecting the control and to provide means for delaying the superimposing of the voltage component for a short time after the change in the regulator output circuit caused by the change in the regulated quantity.

It is an object of this invention to provide an electronic regulator of the above-indicated character in which the changes in the regulated quantity from the desired value introduce a compensating voltage component into the detector circuit of the regulator that aids the change in the control circuit caused by the variation in the regulated quantity from its desired value that initiates the operation of the regulator.

It is a further object of this invention to provide means for effecting a predetermined time delay in the introduction of the compensating voltage component into the detector tube circuit after a change in the current flow in the control circuit effected by a change in the regulated quantity.

Figure 2:
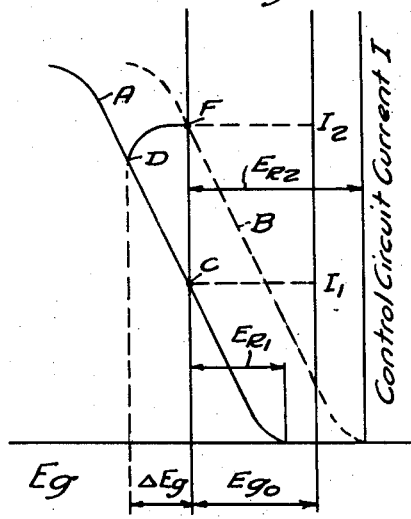

Referring to the drawing:

Figure 1 is a diagrammatic view of circuits and apparatus illustrating one preferred embodiment of the invention; and Fig. 2 shows curves illustrating certain relations existing between certain voltage components and control circuit current effecting the operation of the regulator system.

Referring to Figure 1, a direct current generator is illustrated having an armature winding 1 connected to load circuit conductors 2 and 3, and a field winding 4, the energization of which is controlled by an electronic regulator comprising the tubes 5 and 6. The tube 5 includes an anode 7, cathode 8 and grid 9. To the grid circuit of this tube, a potential is applied consisting of several voltage components, the principal one of which is the voltage E across the terminals of the regulator generator. The grid circuit of the tube 5 extends from the cathode 8 through conductor 11, condenser 12, conductor 13, to the negative terminal conductor 3 of the armature 1 and from the positive terminal conductor 2 through conductor 14, and battery 16 to the grid 9. The voltage of the battery 16 is such as to nearly counterbalance the voltage of the armature 1. In order to avoid undesirable coupling action between the tubes 5 and 6, each tube is provided with its own source of anode voltage 17 and 18, respectively.

Current flows from the battery 17 through tube 5, conductors 11 and 19, resistor 21, and conductor 22 to the negative terminal of the battery 17 in accordance with variations in the conductivity of the tube 5 as controlled by its grid circuit voltage.

The tube 6 incudes a cathode 23, anode 24 and grid 25. The grid circuit of tube 6 extending from the cathode 23 through resistor 21, conductor 22 and a portion of the resistance 26, connected in shunt to the battery 17, and conductor 27. By varying the point of connection of conductor 27 to resistor 26, any desired positive grid bias may be included in this circuit. A negative grid bias is introduced into the grid circuit, the value of which is determined by the voltage drop across the resistor 21, which is, in turn, determined by the conductivity of the tube 5 so that as the conductivity of the tube 5 increases, the negative grid bias of the tube 6 likewise increases, thus causing a greater current to flow from the battery 18 through the field winding 4. This circuit extends from the positive terminal of the battery 18 through the tube 6, conductor 19, resistor 28, conductor 29, and field winding 4 to the negative terminal of the battery 18. The negative terminal of the resistor 28 is connected through a resistor 31 to the terminal of the condenser 12 connected to conductor 13.

It will be noted that the voltage drop across the condenser 12 will, under static conditions of the regulator, correspond to the voltage drop across the resistor 28, which is proportional to the current in the field winding 4. This voltage drop introduces a negative bias into the grid circuit of the tube 5 which increases with increased field current. The effect of the condenser 12 is to introduce a time delay in introducing this voltage component into the grid circuit of the tube 5, since upon an increase in voltage across the resistor 28, a charging current flows to the condenser 12 which prevents the change in the voltage across the resistor 28 from becoming immediately effective in the grid control circuit, and likewise, upon a decrease in the voltage drop across the resistor 28, current flows from the condenser 12 in the opposite direction in the local circuit of resistors 28 and 31 to prevent the change in the voltage drop across resistor 28 from being immediately effective in the grid control circuit.

The diagram of Fig. 2 illustrates the characteristic operation of the regulator system. In the figure $E_g$ representing the grid voltage of the tube 5 is plotted as abscissa against I, the current in the circuit of the field winding 4, which is the output current from the tube 6. The curve A represents the static characteristic curve of the electronic tube regulator under given conditions of the system. Let us assume that the regulating system is operating in a state of equilibrium and that the grid voltage has the value $E_{go}$ and the field current the value $I_1$ corresponding to the point C on the curve A. If now the grid voltage changes by an amount $\Delta E_g$ corresponding to a change in the voltage of the regulated generator, the immediate result will be an increase in the magnitude of the field current I corresponding to movement of the point C upwardly along the curve A. The immediate corresponding change in field current is represented by the vertical distance between the points C and D on curve A. After a few instants the increase in the voltage drop across the resistor 28 which caused the increase in the field current effects a like increase in the voltage component $E_R$ across the condenser 12 to increase the negative bias in the grid circuit of tube 5 thus increasing the component across the condenser 12 from the value $E_{R1}$ to $E_{R2}$ and, in effect, shifting the characteristic curve of the regulator from the position A to the position B shown in dotted lines, the point representing the relation between grid voltage and field current moving along the solid line from point D on curve A to the point F on curve B. If the resistor 28 has the proper value with respect to the other parts of the circuit, the point F will be immediately above the point C on the curve so that the grid voltage $E_g$ necessary to maintain the field current $I_2$ is the same as that necessary to maintain the current $I_1$, under the different machine load conditions. In other words, the voltage drop across the resistor 28 is just sufficient to compensate for the static error inherent in the regulator, so that, for different machine loads the excitation necessary to maintain the same generator output voltage will result from the same grid voltage on the detector tube 5. It will also be noted that by delaying the introduction of the changed value in the compensating voltage $E_R$ into the grid circuit of the tube 5 until the field current circuit is substantially readjusted, the regulating action is positive and takes place without a tendency to introduce hunting action into the system.

Modifications in the circuits and apparatus illustrated may be made within the spirit of my invention and I do not wish to be limited otherwise than by the scope of the appended claims.

I claim as my invention:

1. In combination, a dynamo-electric machine being regulated, an excitation circuit for governing said machine, a regulator comprising a pair of grid-controlled electronic tubes one of which is connected to control the flow of current in the excitation circuit, means for impressing a unidirectional voltage upon the grid circuit of the other one of said tubes that is a measure of a quantity to be regulated, means for impressing a unidirectional voltage on the grid circuit of the first named of said tubes that varies with the output current through the second named tube, means responsive to the current flow through the first named tube for introducing a voltage component into the grid circuit of the second named tube for varying the conductivity of that tube in the same direction as the change in conductivity of the tube causing the change in current flow through the first named tube, and means controlled by the conductivity of the first named tube for controlling the regulated quantity.

2. In combination, a dynamo-electric machine being regulated, an excitation circuit for governing said machine, a regulator comprising a pair of grid-controlled electronic tubes one of which is connected to control the flow of current in the excitation circuit, means for impressing a unidirectional voltage upon the grid circuit of the other one of said tubes that is a measure of a quantity to be regulated, means for impressing a unidirectional voltage on the grid circuit of the first named tube that varies with the output current through the second named tube, means responsive to the current flow through the first named tube for introducing, after a time delay, a voltage component into the grid circuit of the second named tube for varying the conductivity of that tube in the same direction as the change in conductivity of the tube causing the change in current flow through the first named tube, and means controlled by the conductivity of the first named tube for controlling the regulated quantity.

3. In combination, a dynamo-electric machine being regulated, an excitation circuit for governing said machine, a regulator including two grid-controlled electronic tubes one of which is connected to control the flow of current in said excitation circuit and the other of which is connected to control the grid potential of the first named tube, the grid of the second named tube being connected to be responsive to an electric characteristic of the machine being regulated, an impedance means connected in the grid control circuit of the second named tube, and means for developing a voltage component across said impedance means that is a measure of the current flow in said excitation circuit.

4. In combination, a dynamo-electric machine being regulated, an excitation circuit for governing said machine, a regulator including two grid-controlled electronic tubes one of which is connected to control the flow of current in said excitation circuit and the other of which is connected to control the grid potential of the first named tube, the grid of the second named tube being connected to be responsive to an electric characteristic of the machine being regulated, an impedance means connected in the grid control circuit of the second named tube, means for developing a voltage component across said impedance means that is a measure of the current flow in the excitation circuit to compensate for the load on the machine, and means for delaying the change in said voltage component following a change in the excitation circuit current.

ERNST LUDWIG.